United States Patent

Roffman et al.

Patent Number: 5,715,031
Date of Patent: Feb. 3, 1998

[54] CONCENTRIC ASPHERIC MULTIFOCAL LENS DESIGNS

[75] Inventors: Jeffrey H. Roffman; Edgar V. Menezes, both of Jacksonville, Fla.

[73] Assignee: Johnson & Johnson Vision Products, Inc., Jacksonville, Fla.

[21] Appl. No.: 433,736

[22] Filed: May 4, 1995

[51] Int. Cl.⁶ .................. G02C 7/04; G02C 7/02; A61F 2/16

[52] U.S. Cl. .................. 351/161; 351/177; 623/6

[58] Field of Search .................. 351/161, 168, 351/160 R, 160 H, 177; 623/6

[56] References Cited

U.S. PATENT DOCUMENTS

| | | | |
|---|---|---|---|
| 4,580,882 | 4/1986 | Nuchman | 351/161 |
| 5,002,382 | 3/1991 | Seidner | 351/161 |
| 5,017,000 | 5/1991 | Cohen | 351/161 |
| 5,125,729 | 6/1992 | Mercure | 351/161 |
| 5,181,053 | 1/1993 | Brown | 351/161 |
| 5,214,453 | 5/1993 | Giovanzana | 351/161 |
| 5,220,359 | 6/1993 | Roffman | 351/177 |
| 5,229,797 | 7/1993 | Futhey et al. | 351/161 |
| 5,406,341 | 4/1995 | Blum et al. | 351/160 R |
| 5,436,678 | 7/1995 | Carroll | 351/161 |

*Primary Examiner*—David C. Nelms
*Assistant Examiner*—Jordan M. Schwartz

[57] ABSTRACT

Concentric aspheric multifocal lens designs are disclosed which use a combination of an aspheric front surface, which results in aberration reduction and contrast vision enhancement, along with a concentric multifocal back surface, to produce a lens design which affords clear vision at a distance and also near without a loss in contrast which is generally typical of prior art simultaneous vision, concentric multifocal lens designs. The aspheric surface improves the modulation transfer function (MTF) of the lens eye combination which improves the focus and contrast of both distance and near images. The design form is valid for contact lenses and intraocular lenses.

23 Claims, 6 Drawing Sheets

FUNCTION ILLUSTRATIONS
A, D, E, & F

FUNCTION ILLUSTRATIONS
A, B, & C

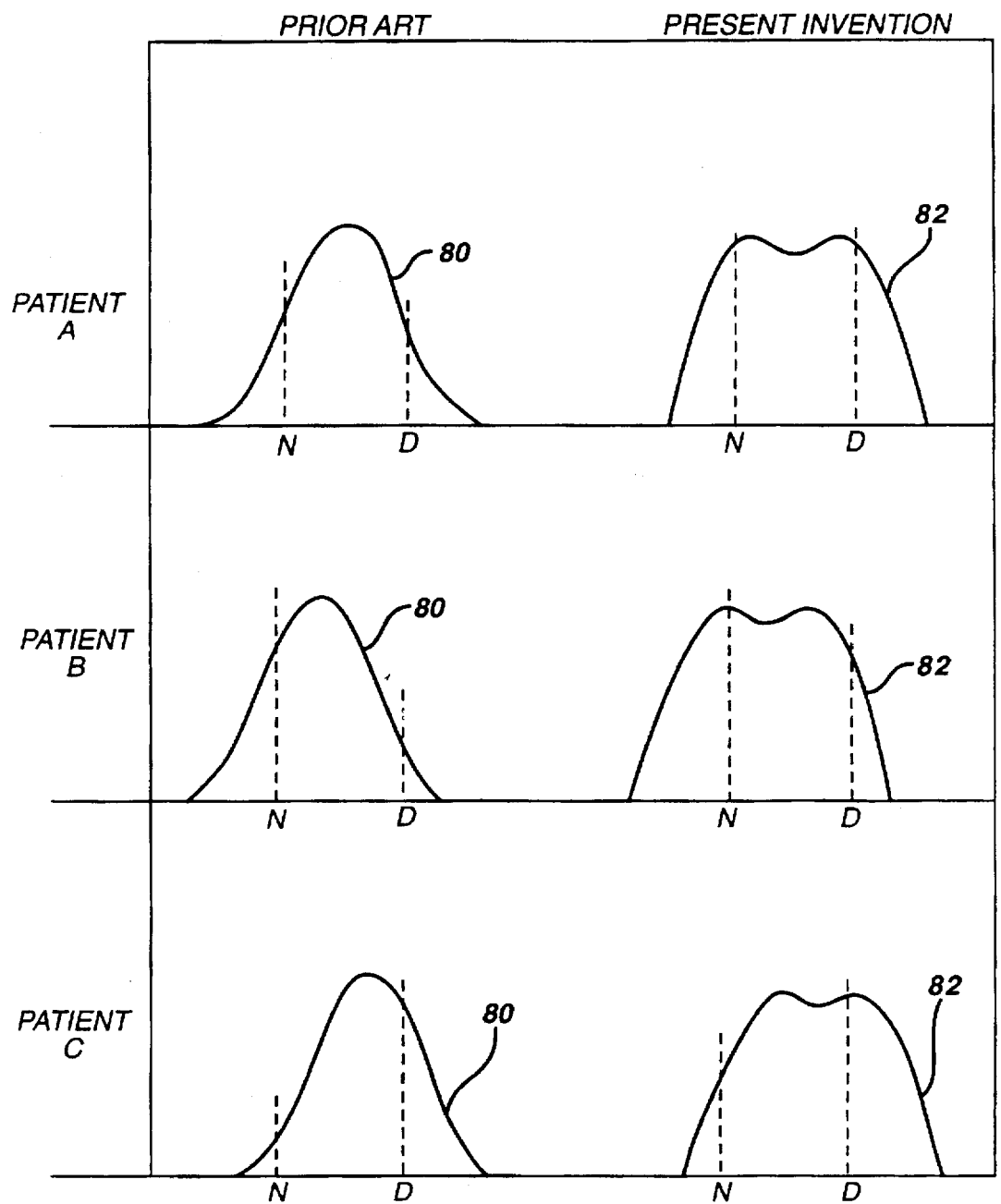
FIG. 6  RETINAL FOCUS DISTRIBUTIONS (EFFECT OF PATIENT VARIABILITY)

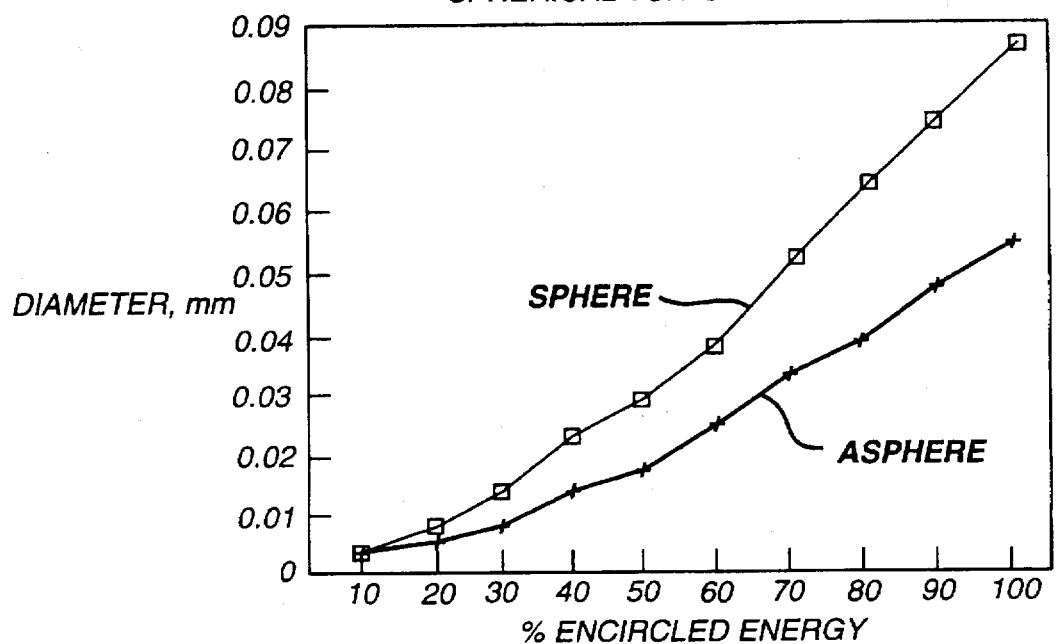
FIG. 7 % ENCIRCLED ENERGY; DISTANCE CASE SPHERICAL VS. ASPHERICAL
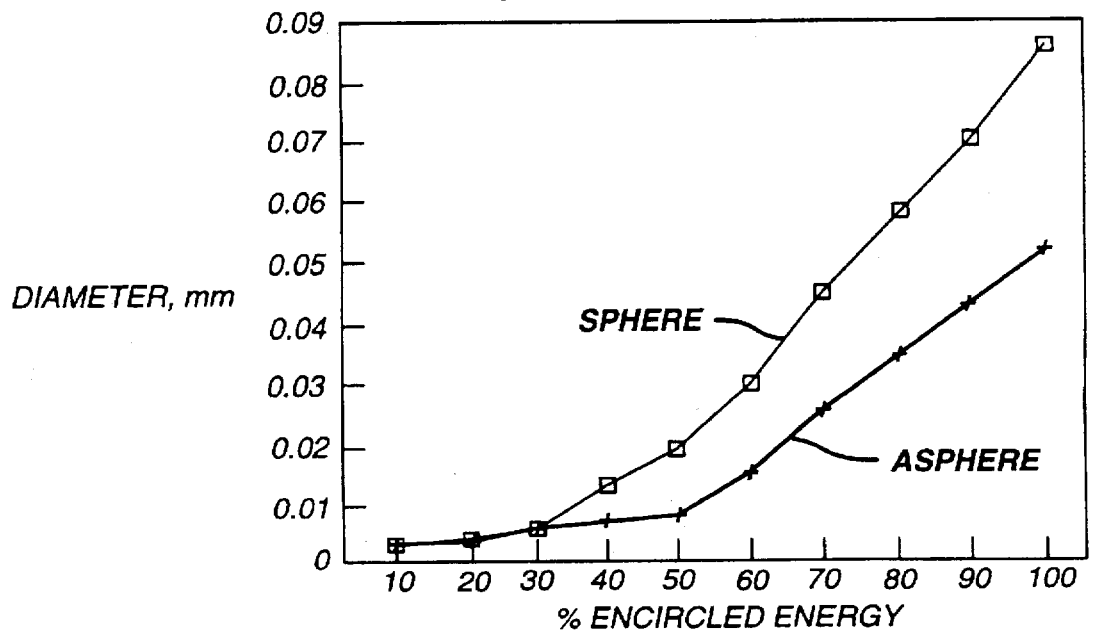
FIG. 8 % ENCIRCLED ENERGY; NEAR CASE SPHERICAL VS. ASPHERICAL

CONCENTRIC ASPHERIC MULTIFOCAL LENS DESIGNS

BACKGROUND OF THE INVENTION

1. Field of the Invention

In a first general aspect, the present invention improves the functionality of multifocal concentric annular ring lens designs. The present invention combines the beneficial characteristics of aspheric and concentric lens designs, and combines aspheric front curves with concentric back curves to provide simultaneous vision which approaches the continuous range of focus found on young, nonpresbyopic subjects. The design form is valid for contact lenses and intraocular lenses.

The aspheric surface improves the modulation transfer function (MTF) of the lens eye combination. The improved modulation transfer function improves the focus and contrast of both distance and near images. The concentric surface provides an optimal pupil split of the incoming light into near and distant foci. In addition, the power in the alternating lens zones need not be constant, but can vary by several mathematical functions. This concept allows the designer to produce lens designs that tune the add and its location on the lens to fit a patient's particular visual requirements.

The present invention relates in a second general aspect to concentric aspheric multifocal lens designs, and more particularly pertains to concentric aspheric multifocal lens designs which use a combination of an aspheric surface, which results in a reduction in aberrations and an enhancement in contrast, along with a concentric multifocal surface, to produce a lens design which results in clear vision at a distance and also clear vision near without a loss in contrast, which is generally typical of prior art simultaneous vision, concentric multifocal lens designs.

2. Discussion of the Prior Art

Prior art concentric multifocal lens designs divide the lens into a central area and surrounding concentric areas, some of which have a distance power and some of which have a near power, wherein the near power is calculated based upon the standard near add specified in an ophthalmic prescription. In such concentric multifocal contact lens designs, the pupil area is divided between distance power areas and near power areas, and the effective power at any one power is reduced due to the division of area.

U.S. Pat. No. 5,448,312, entitled PUPIL TUNED MULTIFOCAL OPHTHALMIC LENS, discloses a multifocal concentric ophthalmic lens designed for presbyopic patients which is constructed with three general annular lens portions in a multifocal design. A central circular portion of the lens has only the patient's distance corrective power, and is surrounded by a first inner annular portion, which can consist of multiple annular rings having an inner radial portion which enhances the patient's near focal power encircled by radial portions of substantially equal cumulative amounts of distance and near optical power focal correction for the patient. This is surrounded by a second outer annular portion, which can consist of one or more annular rings having additional distance focal power near the periphery of the optical area of the ophthalmic lens. Each annular ring has either a near or distance optical power and works in combination with other lens portions to yield the desired focal ratio in that portion of the lens.

U.S. Pat. No. 5,327,179 discloses a pair of ophthalmic, one for each eye, wherein each lens has at least two optical powers, one for near vision and one for distance vision. The center portion of the lens is provided with the distance optical power, and is surrounded by near optical power and distance optical power annular rings to provide the desired combined, cumulative ratio of near and distance focal length areas at each pupil diameter. The patient's dominant eye is given a lens having more than 50% of distant optical power and the non-dominant eye is given a lens having more than 50% of near optical power.

Conventional multifocal contact lens designs have employed either translating/alternating power designs, or a host of simultaneous vision designs, such as aspherics, concentrics, diffractive, etc. Concentric designs are known to be able to provide both distance and near power in specific zonal splits. This enables the wearer to see clearly at both distances, and works especially well in high contrast/high luminance environments. There is some loss of contrast and visual acuity for lower luminance/contrast objects. Front aspheric surface designs provide an extended depth of field with an enhancement of contrast sensitive visual acuity.

SUMMARY OF THE INVENTION

The present invention provides concentric aspheric multifocal lens designs which use a combination of an aspheric surface, which results in aberration reduction and vision contrast enhancement, along with a concentric multifocal surface, to produce a lens design which affords clear vision at a distance and also near without a loss in contrast which is generally typical of prior art simultaneous vision, concentric multifocal lens designs.

The present invention combines the beneficial characteristics of aspheric and concentric designs, and combines aspheric front curves with concentric back curves to provide simultaneous vision which approaches the continuous range of focus found on young, nonpresbyopic subjects. The aspheric surface improves the modulation transfer function (MTF) of the lens eye combination. This improves the focus and contrast of both distance and near images. The concentric surface provides an optimal split of the incoming light into near and distant foci. The design form is valid for contact lenses and intraocular lenses.

The present invention improves the functionality of simultaneous vision concentric multifocal designs. In such designs, the power in the alternating concentric zones need not be constant, but can vary by several mathematical functions. This concept allows the designer to produce lens designs that tune the add and its location on the lens to fit a patient's visual needs.

In accordance with the teachings herein, the present invention provides an aspheric multifocal concentric annular ring lens design which reduces aberrations and enhances contrast to provide improved visual acuity. The front surface of the lens has an aspheric curve which improves the modulation transfer function of the lens and results in reduced aberrations and enhanced contrast. The back surface of the lens comprises a multifocal curve having a plurality of concentric spherical annular rings, wherein the improved modulation transfer function improves the focus and contrast of both the distance image and the near image and produces a lens design which results in clear vision at a distance and also clear vision near without a loss of contrast.

In greater detail, in several preferred embodiments the plurality of annular rings surround a central area comprising a circular disc having a spherical surface corresponding to a patient's basic prescriptive distance optical power. Moreover, the plurality of annular rings include at least one annular ring having a basic prescriptive spherical distance optical power, and at least one second spherical annular ring having a prescriptive spherical near optical power. In alternative embodiments, the central disc can have the patient's prescriptive spherical near optical power. The lens can be a contact lens, such as a soft hydrogel contact lens, or an intraocular lens.

In one preferred embodiment, the front surface aspheric curve comprises a simple elliptical, parabolic or hyperbolic curve, and the multifocal concentric spherical annular ring back curve has a pupil intelligent design similar to U.S. Pat. No. 5,448,312 in which the pupil receives a variable ratio of distance optical power to near optical power, depending upon the pupil size.

In alternative embodiments, the aspheric surface curve can comprise a spherical central area which is preferably less than 2.0 mm in diameter, to ease in vitro parameter measurement and in vivo fitting, and a surrounding aspheric annulus which can be a simple elliptical, parabolic or hyperbolic curve; or a central spherical or aspheric center zone surrounded by multiple aspheric annuli having increasing k values; or has a progressive continuous aspheric k value from 0 for a spherical curve in the center of the lens to a defined end point in the form of an elliptical, hyperbolic or parabolic curve, by a defined function; or has a spherical central area, having a diameter of preferably less than 2.00 mm, to ease in vitro parameter measurement and in vivo fitting, with a surrounding aspheric curve with a progressive aspheric k value from 0 for a spherical curve in the center of the lens to a defined end point in the form of an elliptical, hyperbolic or parabolic curve, by a defined function.

In different embodiments, the multifocus annular ring back surface curve can have a pupil intelligent design similar to U.S. Pat. No. 5,448,312; or a pupil intelligent design wherein the annular zones are different for the left and right eyes similar to U.S. Pat. No. 5,327,179; or pupil design with a peaking add power function which peaks in the mid range of the pupil; or a design wherein the add power changes with pupil size with a defined linear or polynomial function wherein alternative embodiments, the add power can increase with pupil size or decrease with pupil size; or wherein the annular rings are aspheric.

BRIEF DESCRIPTION OF THE DRAWINGS

The foregoing objects and advantages of the present invention for concentric aspheric multifocal lens designs may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 6 shows several graphs which illustrate how the use of combined aspheric curve/concentric curve designs desensitize patient variability, for three patients A, B and C whose near (N) and distance (D) vision is improved by the designs of the present invention, sometimes significantly;

FIG. 7 illustrates graphs of sphere and asphere radial energy distribution for a distance vision case; and FIG. 8 illustrates graphs of sphere and asphere radial energy distribution for a near vision case.

DETAILED DESCRIPTION OF THE DRAWINGS

Figure 1:
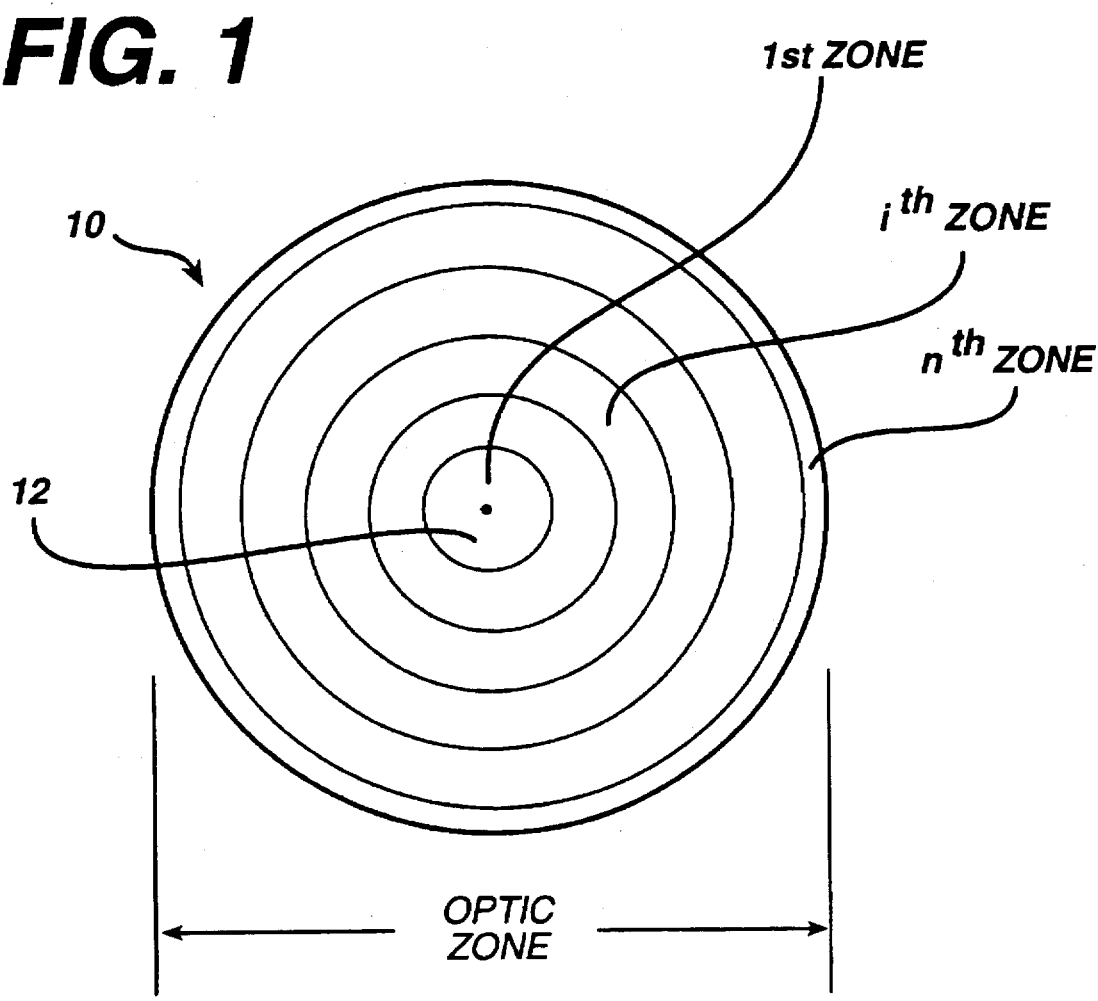
FIG. 1 illustrates a plan view of an exemplary concentric multifocal contact lens or intraocular lens design having a central round area surrounded by n annular zones.

For concentric multifocal lens designs (variable add versions), consider a concentric multifocal contact lens or intraocular lens design 10 having a central round area 12 surrounded by n annular zones as illustrated in FIG. 1. If $r_D$=the radius of curvature for distance correction, and $r_N$=the radius of curvature for near correction, then according to the present invention, the optical power (Pi) of the i th annular zone, at $r_i$, is given by:

$$P_i = \left[\frac{1-(-1)^i}{2}\right][f_1(i)P_d + (1-f_2(i))P_N] + \quad (1)$$
(hereinafter the left part)

$$\left[\frac{1-(-1)^{i-1}}{2}\right][(1-f_3(i))P_d + f_4(i)P_N]$$
(hereinafter the right part).

where $P_i$ is the optical power at ring i, in diopters,
$P_d$ is the distance optical power i, in diopters, and
$P_N$ is the near optical power i, in diopters.

In the above equation, the optical surface power can be changed into an equivalent radius by the known equation $$r = \frac{(n-1)k}{p}$$

where n=the refractive index of the lens material,
k=a constant for the units involved,
for mm for example, k=1000.

Substituting various functionalities for $f_1(i)$, $f_2(i)$, $f_3(i)$ and $f_4(i)$ in equation (1) allows one to generate different variable add embodiments, some of which are shown below.

The general equation (1) can be thought of as a pair of binary switches, with the left and right parts of the equation being toggled by "i". In equation (1), the leading term in the left and right parts of the equation is either zero or one as illustrated below:

| $\frac{1-(-1)^i}{2}$ | | $\frac{1-(-1)^{i-1}}{2}$ |
|---|---|---|
| i | left part P(i) | right part P(i) |
| 1 | 1 | 0 |
| 2 | 0 | 1 |
| 3 | 1 | 0 |
| 4 | 0 | 1 |
| 5 | 1 | 0 |
| 6 | 0 | 1 |
| 7 | 1 | 0 |
| 8 | 0 | 1 |
| 9 | 1 | 0 |
| 10 | 0 | 1 |

The values of fn(i) toggle the "polarity" of the general equation (1).

In a first exemplary embodiment, wherein f1(i)=f2(i)=f3(i)=f4(i)=1, the general equation simplifies as below:

| i | P(i) |
|---|------|
| 1 | d |
| 2 | n |
| 3 | d |
| 4 | n |
| 5 | d |
| 6 | n |
| 7 | d |
| 8 | n |
| 9 | d |
| 10 | n |

In this exemplary embodiment the combination of the two toggles, the first due to i, the second due to f(n), allows the function to toggle selectively for Pd or Pn with a center distance polarity. This exemplary embodiment equates to a concentric multifocal lens with distance in the center and alternating near and distance concentric rings as shown in the above table wherein the power of all near rings are equal and constant, and the power of all distance rings are equal and constant.

In a second exemplary embodiment, $f1(i)=f2(i)=f3(i)=f4(i)=0$. This simplifies the general equation as below: Equation 1 then simplifies to equation 3, near center.

| i | P(i) |
|---|------|
| 1 | n |
| 2 | d |
| 3 | n |
| 4 | d |
| 5 | n |
| 6 | d |
| 7 | n |
| 8 | d |
| 9 | n |
| 10 | d |

This exemplary embodiment equates to a concentric multifocal lens with near in the center and alternating distance and near concentric rings as shown in the above table wherein the power of all distance rings are equal and constant, and the power of all near rings are equal and constant.

A third class of exemplary embodiments has a constant Pd, with the center and odd rings being Pd, and even rings Pn; with Pn nonconstant because f4(i) is nonconstant. In the third class of exemplary embodiments, $f1(i)=f2(i)=f3(i)=1$, and f4(i) is a defined function, as in the following examples A through F. The functions modify the normalized near power (Pn=1) as follows. In this case, the near power, Pn, only acts at the even annuli even though the odd rings are calculated and shown.

The following table illustrates the third class of exemplary embodiments wherein $f1(i)=f2(i)=f3(i)=1$, and f4(i) is the function described at the top of the table for f4(i), with the constraints as noted, for the columnar examples A, B, C, D, E and F.

| | ex. A]<br>$f(4)(i) = K = Pn = 1$ | ex. B]<br>$f4(i) = \frac{(z-i)}{(z-1)} + k$<br>wherein z = total no. of annuli and k = arbitrary constant, defines decreasing function | ex. C]<br>$f4(i) = \frac{(i-1)}{(z-1)} + k$<br>defines an increasing function | ex. D]<br>$f4(i) = e^{\wedge} - a(i-1) + k$<br>where a = arbitrary constant, defines exponential decrease | ex. E]<br>$f4(i) = e^{\wedge} - a(z-i) + k$<br>defines exponential increase | ex. F]<br>$f4(i) = \frac{(z/2 - |z/2 - i|) + k}{2z}$<br>defines linear increase and then linear decrease |
|---|---|---|---|---|---|---|
| i | Pn | Pn | Pn | Pn | Pn | Pn |
| 1 | 1.00 | 1.50 | 0.50 | 1.60 | 0.67 | 0.60 |
| 2 | 1.00 | 1.39 | 0.61 | 1.34 | 0.69 | 0.80 |
| 3 | 1.00 | 1.28 | 0.72 | 1.15 | 0.72 | 1.00 |
| 4 | 1.00 | 1.17 | 0.83 | 1.01 | 0.77 | 1.20 |
| 5 | 1.00 | 1.06 | 0.94 | 0.90 | 0.82 | 1.40 |
| 6 | 1.00 | .94 | 1.06 | 0.82 | 0.90 | 1.20 |
| 7 | 1.00 | .83 | 1.17 | 0.77 | 1.01 | 1.00 |
| 8 | 1.00 | .72 | 1.28 | 0.72 | 1.15 | 0.80 |
| 9 | 1.00 | .61 | 1.39 | 0.69 | 1.34 | 0.60 |
| 10 | 1.00 | .50 | 1.50 | 0.67 | 1.60 | 0.40 |
| k | 0.00 | .50 | 0.50 | 0.60 | 0.60 | 0.4 |
| e | | | | 2.71828 | 2.71828 | |
| a | | | | 0.30 | 0.30 | |

Figure 2:
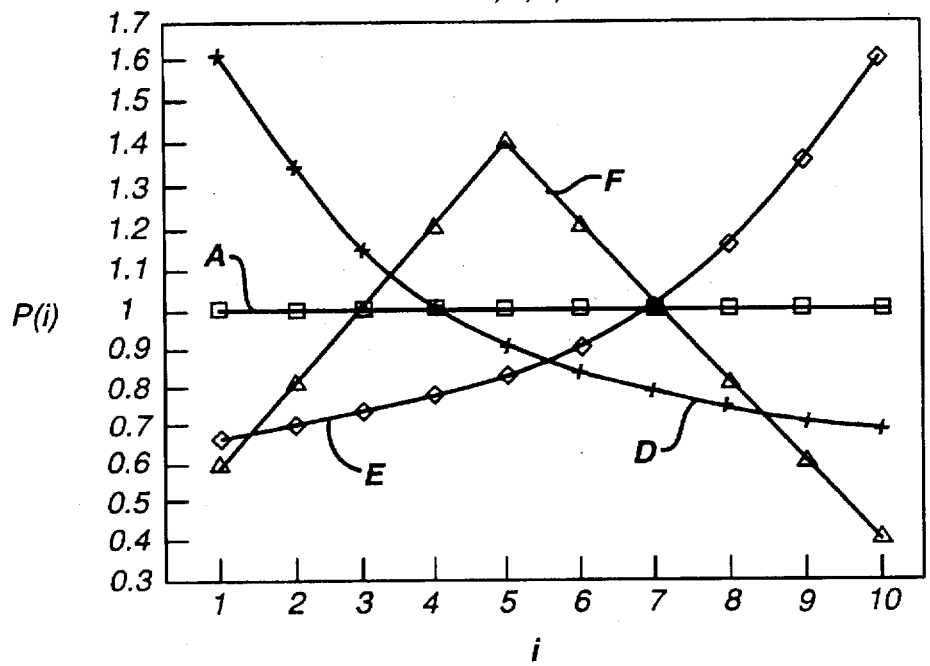
FIG. 2 illustrates exemplary function curves for Functions A, D, E and F wherein the curves are of optical power versus lens function (i)
Figure 3:
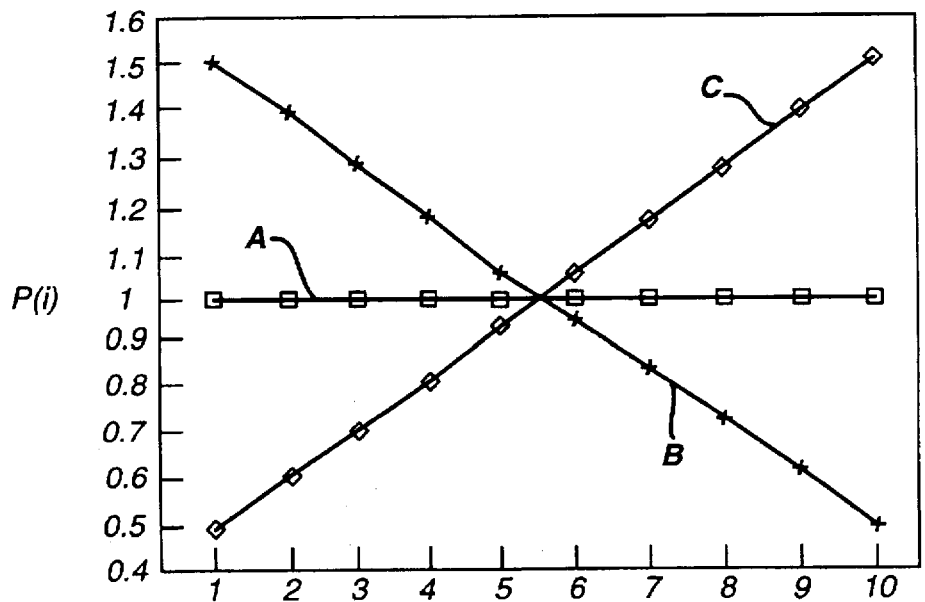
FIG. 3 illustrates exemplary function curves for Functions A, B and C wherein the curves are of optical power versus lens function (i)

The examples A] through F] are shown plotted in FIGS. 2 and 3.

Some function examples for $f_4(i)$:

$$f_4(i) = k = P_N = 1 \qquad \text{A]}$$

$$f_4(i) = \frac{z-i}{z-1} + k \qquad \text{B]}$$
where Z = total # of annuli
k = arbitrary constant $$f_4(i) = \frac{i-1}{z-1} + k \qquad \text{C]}$$

$$f_4(i) = e^{-a(i-1)} + k \text{ where } a = \text{arbitrary constant} \qquad \text{D]}$$
$$f_4(i) = e^{-a(z-i)} + k \qquad \text{E]}$$

$$f_4(i) = \frac{Z/2 - |Z/2 - i|}{2Z} + k \qquad \text{F]}$$

FIG. 2 illustrates exemplary function curves for Functions A, D, E and F wherein the curves are of optical power versus lens function (i).

FIG. 3 illustrates exemplary function curves for Functions A, B and C of optical power versus lens function (i).

In a second general aspect, the present invention combines in specific fashions the best characteristics of aspheric and concentric designs by combining an aspheric surface with a concentric surface. In general, it is preferred that the concentric be on the base or back curve side of the lens, with the aspheric on the front curve side. The aspheric surface improves the modulation transfer function (MTF) of the lens eye combination. This improves the focus/contrast of both the distance and near images. The concentric surface provides the pupil intelligent split of the pupil into near and distant powers.

A general conic equation which describes all conics, including spheres, parabolas, ellipses and hyperbola is:

$$y = \frac{x^2}{r + \sqrt{r^2 - (k+1)x^2}}$$

where
$k=0$ for a sphere,
$k=-1$ for a parabola,
$0 > k > -1$ for an ellipse,
$k < -1$ for a hyperbola.

| General Classes of Lens: | | | |
|---|---|---|---|
| type A] | Front Asphere −k value, for MTF enhancement | with | Back Concentric D or N center |
| type B] | Front Asphere −k value, for MTF enhancement or variable power | with | Back Concentric N center |
| type C] | Front Asphere +k value, for variable power | with | Back Concentric D center |

In the MTF enhancement model, the −K value enhances any geometric pupil split.

FIG. 4 is in the form of a chart illustrating only the optic zone of different types of exemplary front curves and different types of exemplary back curves, pursuant to the teachings of various embodiments of the present invention.

Figure 4A:
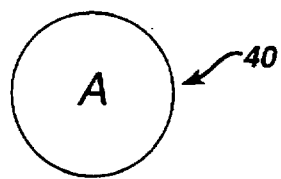
FIGS. 4A–4J are illustrating only the optic zone of different types of exemplary front curves and different types of back curves for a lens pursuant to the present invention.
Figure 4B:
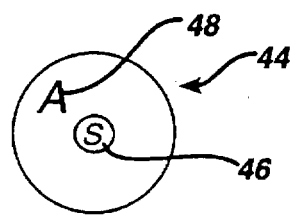
Figure 4C:
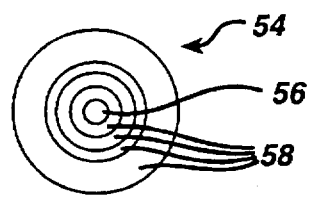
Figure 4D:
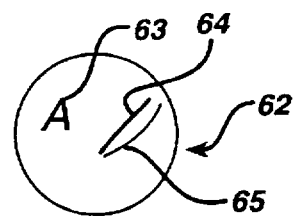
Figure 4E:
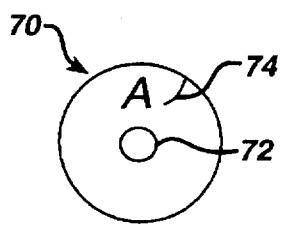
Figure 4F:
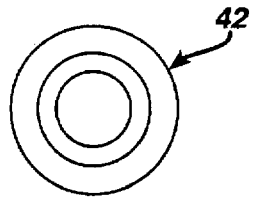

FIGS. 4A and 4F combined illustrate a preferred embodiment having a front aspheric curve 40, which can be a simple elliptical, parabolic or hyperbolic curve, in combination with a multifocal concentric spherical annular ring back curve 42, which can be a pupil intelligent design as disclosed in patent application (VTN 56) in which the pupil receives a variable ratio of distance optical power to near optical power, depending upon the pupil size.

FIG. 4B illustrates a front curve 44 having a spherical central area 46 approximately 2.00 mm in diameter to ease in vitro parameter measurement and in vivo fitting, with a surrounding aspheric annulus 48 which can be a simple elliptical, parabolic or hyperbolic curve.

FIG. 4C illustrates a front curve 54 having a central spherical or aspheric center zone 56 surrounded by multiple aspheric annuli 58 having differing or increasing k values.

FIG. 4D illustrates a front aspheric curve with a progressive, continuous aspheric 63 having a k value (pursuant to the above equation) which varies from 0 for a spherical curve in the center of the lens to a defined end point in the form of an elliptical, hyperbolic or parabolic curve, by a defined function such as a linear function 64 or a polynomial or quadratic function 65.

FIG. 4E illustrates a front curve 70 having a spherical central area 72 about 2.00 mm in diameter to ease in vitro parameter measurement and in vivo fitting, with a surrounding aspheric curve 74 with a progressive, continuous aspheric k value from 0 for a spherical curve in the center of the lens to a defined end point in the form of an elliptical, hyperbolic or parabolic curve, by a defined function such as a linear function or a polynomial or quadratic function, in combination with a multifocal concentric spherical annular ring back curve 76.

FIG. 4F illustrates a multifocal concentric spherical annular ring back curve 42, which can be a pupil intelligent design as disclosed in U.S. Pat. No. 5,448,312 in which the pupil receives a variable ratio of distance optical power to near optical power, depending upon the pupil size.

Figure 4G:
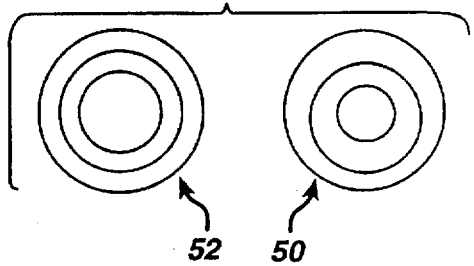

FIG. 4G illustrates a multifocal concentric spherical annular ring back curve, which can be of a design as disclosed in U.S. Pat. No. 5,327,179 wherein the contact lens for the right eye 50 has a different concentric annular ring pattern than the contact lens for the left eye 52.

Figure 4H:
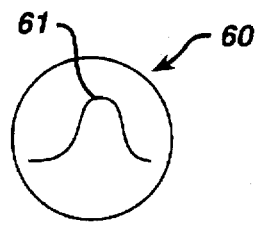

FIG. 4H illustrates a back surface 60 having a pupil design with a peaking add power function 61, which increases as one goes outward from the center of the lens to a maximum approximately one half way to the edge of the lens and decreases thereafter as one continues to the edge of the lens.

Figure 4I:
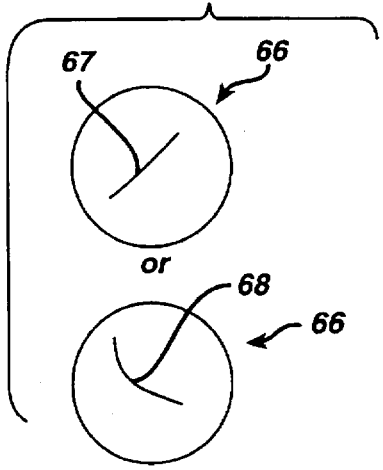

FIG. 4I illustrates a multifocal concentric annular ring back surface 66 wherein the add power either increases 67 or decreases 68 with pupil size with either a linear 67 or polynomial 68 function.

Figure 4J:
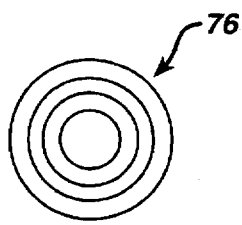

FIG. 4J illustrates a multifocal concentric aspheric annular ring back curve 76.

Figure 5:
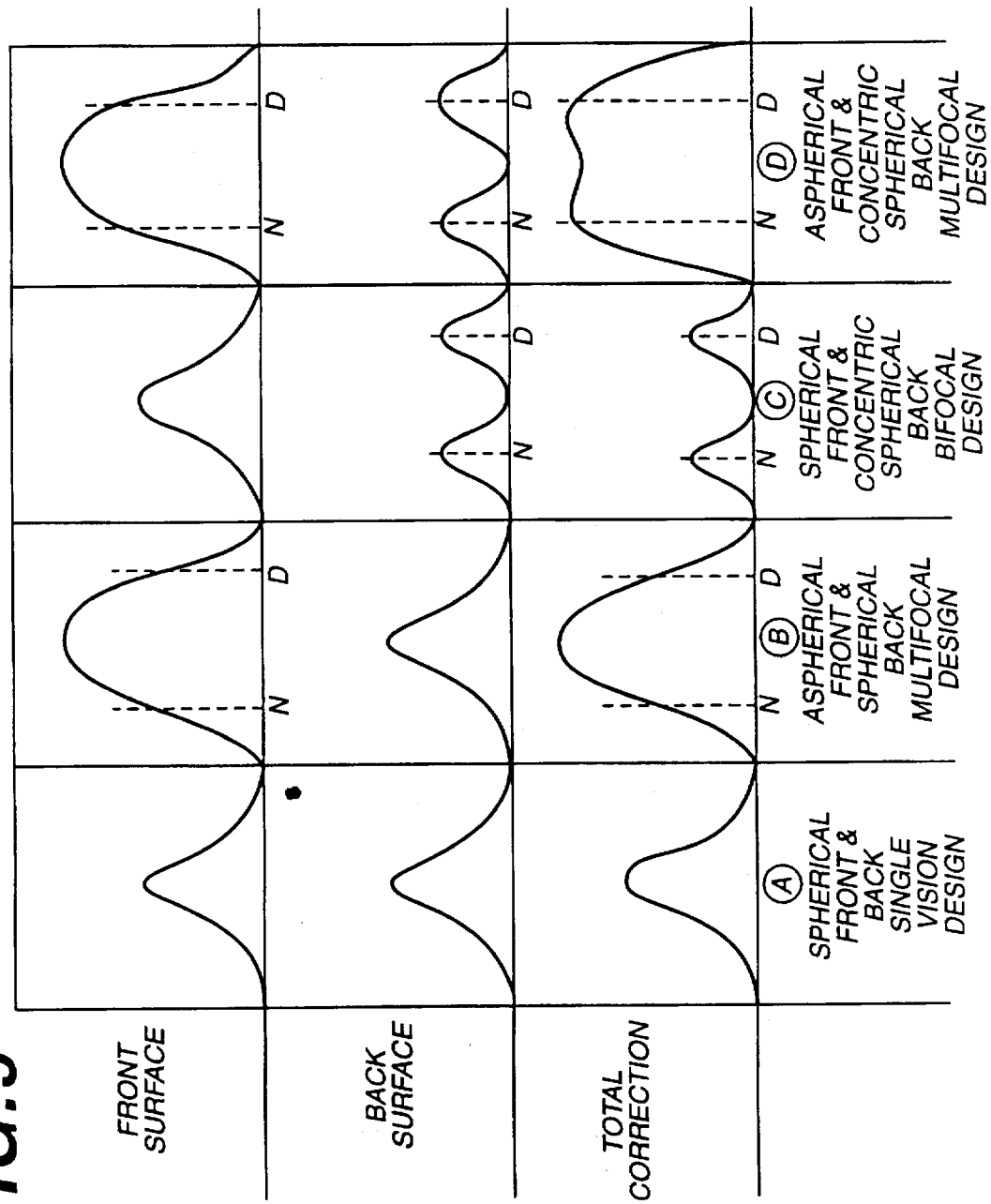
FIG. 5 illustrates the retinal focus distributions for four different types of lenses, wherein columns A, B and C represent prior art lens designs, and column D represents lens designs pursuant to the present invention.

FIGS. 5 and 6 illustrate the advantages of combining aspherical front curve designs with concentric (or radial) spherical back curve designs in a single lens.

FIG. 5 illustrates the retinal focus distributions for:
  column A (spherical front and back surfaces, single vision design, as in the prior art);
  column B (aspheric multifocal front and spherical back surfaces, design, as in the prior art);
  column C (spherical front, and concentric spherical back surface, bifocal design, as in the prior art); and
  column D (aspheric front, and concentric spherical back surface, multifocal design, present invention).

FIG. 5 illustrates that the intensity of light focusing on the retina at both a near and a distance focus is increased for designs of the present invention (example D) when compared to conventional prior art spheric designs (example A), or conventional prior art aspheric multifocal designs (example B), or conventional prior art concentric designs (example C). In the illustration, spherical optics (in example A) provide a reference intensity of 1.0 which is equally split for concentric designs (example C) to a value of 0.5; In contrast thereto, the aspherical front and concentric spherical back designs of the present invention in Example D produce an intensity significantly greater than 1.0 for both near and distance vision and an increased depth of focus.

FIG. 6 illustrates how the use of combined aspheric curve/concentric curve designs desensitize patient variability. In this illustration, three patients A, B and C are shown whose near (N) and distance (D) focus are shifted slightly with respect to a conventional concentric multifocal curve design 80. Note that patient A has significantly improved near N and distance D vision. Note also that if patients B and C were fitted with only a concentric multifocal curve, as illustrated on the left sides of FIG. 6, patient B suffers a loss of distance D vision, while patient C suffers a loss of near N vision. When the same concentric multifocal curve is combined with an aspheric curve, as illustrated by curves 82 on the right sides of FIG. 6, both near N and particularly distance D vision by patient B are improved significantly, and both the near N in particular and the distance D vision by patient C are also improved significantly. In summary, vision is improved significantly because of the improved depth of field obtained by the combination of an aspheric front surface with the concentric multifocal back surface since the distribution is bimodal.

Ray tracing was performed for a typical front aspheric/back concentric combination. The ray trace model was the axial myopic human eye derived using the Super-OSLO computer program, at an entrance pupil diameter of 5.50 mm.

Data shown is spot size diameter, in mm. Other models have been tried with similar results.

| SPOT SIZE | | | |
|---|---|---|---|
| | Spherical Front | Aspheric | Reduction |
| Distance | .031 | .019 | 38% |
| Near | .028 | .016 | 43% |

For the near distance, the object distance was moved to 40 cm, and the model was changed to reflect a limited amount of anatomical accommodation available to a patient in their late 40's in age. The field of view was on axis at 0° elevation.

FIG. 7 illustrates graphs of sphere and asphere radial energy distribution for a distance vision case, and FIG. 8 illustrates graphs of sphere and asphere radial energy distribution for a near vision case.

This method characterizes an image by encircling the energy with increasing diameter circles, and normalizing the "detected" energy. This results in larger radii than the spot size discussed above, since those spot sizes are rms deviations from the spot centroid. Others will be more obvious by the Radial Energy Distribution (circle of focus) method. However, it can readily be seen that the asphere/concentric out performs the pure spherical concentric at both distance and near.

One object of the present invention is to start with aspheric and multifocal concentric annular ring lens designs as disclosed herein, and then use in vivo image quality analysis equipment, such as an aberroscope or MTF point spread apparatus, to evaluate, identify and quantify any residual aberrations. These residual aberrations can then be reduced further by redefining the aspherization of preferably the nonconcentric surface of the lens, or alternatively by aspherization of the concentric surface of the lens, to improve visual performance and acuity. Thus, the present invention provides an improvement in the performance of designs for spherical ametropia, presbyopia, or astigmatism which is accomplished by a reduction of aberrations of the combination of the lens and the eye system. The reduction in aberrations does not correct the ametropia by itself. First, a subject (or population) is fitted with a concentric lens, and then the subject (or population) is tested with an in vivo image quality device to determine residual aberrations with the lens in place on the eye. Next, the lens is redesigned as indicated above to decrease the measured residual aberrations.

Obviously, many different embodiments of the present invention are possible, with alterations of the type of aspheric curve, the number of annular rings, the widths and arrangement of the annular rings, and the optical powers assigned to each of the annular rings.

While several embodiments and variations of the present invention for concentric aspheric multifocal lens designs are described in detail herein, it should be apparent that the disclosure and teachings of the present invention will suggest many alternative designs to those skilled in the art.

What is claimed is:

1. An aspheric multifocal concentric annular ring lens which reduces aberrations and enhances contrast to provide improved visual acuity, comprising:
   a. a lens having a front surface and a back surface, wherein one of the front and back surfaces has an aspheric curve which comprises a spherical central area, and a surrounding aspheric annulus which comprises a simple elliptical, parabolic or hyperbolic curve; and
   b. the other of the front and back surfaces comprises a multifocal curve having a plurality of concentric spherical annular rings providing both a distance image and a near image.

2. An aspheric multifocal concentric annular ring lens as claimed in claim 1, wherein the front surface has the aspheric curve.

3. An aspheric multifocal concentric annular ring lens as claimed in claim 1, wherein the front surface has the multifocal curve.

4. An aspheric multifocal concentric annular ring lens as claimed in claim 1, wherein the plurality of concentric spherical annular rings surround a central area comprising a circular disc.

5. An aspheric multifocal concentric annular ring lens as claimed in claim 4, wherein the circular disc has a spherical surface corresponding to a patient's basic prescriptive distance optical power.

6. An aspheric multifocal concentric annular ring lens as claimed in claim 4, wherein the plurality of concentric spherical annular rings include at least one annular ring having a basic prescriptive spherical distance optical power, and at least one second spherical annular ring having a prescriptive spherical near optical power.

7. An aspheric multifocal concentric annular ring lens as claimed in claim 1, wherein the spherical central area is less than 2.00 mm in diameter.

8. An aspheric multifocal concentric annular ring lens as claimed in claim 1, wherein the multifocal concentric spherical annular ring curve has a pupil independent design in which the pupil receives substantially the same ratio of distance optical power to near optical power, regardless of the pupil size.

9. An aspheric multifocal concentric annular ring lens as claimed in claim 1, wherein the multifocal concentric spherical annular ring curve on the lens for the right eye has a different concentric annular ring pattern than the lens for the left eye.

10. An aspheric multifocal concentric annular ring lens as claimed in claim 1, wherein the multifocal concentric annular ring surface comprises an add power, said add power changes with pupil size with a defined linear or polynomial function.

11. An aspheric multifocal concentric annular ring lens as claimed in claim 10, said add power increases with the pupil size.

12. An aspheric multifocal concentric annular ring lens as claimed in claim 10, said add power decreases with the pupil size.

13. An aspheric multifocal concentric annular ring lens as claimed in claim 1, wherein the concentric annular rings have an aspheric surface.

14. An aspheric multifocal concentric annular ring lens as claimed in claim 1, wherein the lens is a contact lens.

15. An aspheric multifocal concentric annular ring lens as claimed in claim 14, wherein the contact lens is a soft hydrogel contact lens.

16. An aspheric multifocal concentric annular ring lens as claimed in claim 1, wherein the lens is an intraocular lens.

17. An aspheric multifocal concentric annular ring lens as claimed in claim 1, wherein the aspheric curve comprises a central spherical or aspheric center zone surrounded by multiple aspheric annuli having increasing k values, where k is a variable in the general conic equation $y=x^2+(r+\sqrt{r^2-(k+1)x^2})$ such that k=0 for a sphere, k=−1 for a parabola, 0>k>−1 for an ellipse, and k<−1 for a hyperbola.

18. A method of producing an aspheric multifocal concentric annular ring lens design which reduces aberrations and enhances contrast to provide improved visual acuity, comprising:
   a. producing a lens having a front surface and a back surface, wherein one of the front and back surfaces has an aspheric curve which comprises a spherical central area, and a surrounding aspheric annulus which comprises a simple elliptical, parabolic or hyperbolic curve and;
   b. the other of the front and back surfaces comprises a multifocal curve having a plurality of concentric spherical annular rings providing both a distance image and a near image;
   c. performing an in vivo image quality analysis, with an in vivo quality analysis instrument, of the lens on the eye to measure any residual aberrations;
   d. reducing the measured residual aberrations by redesigning the lens to improve visual acuity and performance.

19. A method of producing a lens as claimed in claim 18, wherein redesigning the lens includes redesigning the aspheric curve.

20. A method of producing a lens as claimed in claim 18, wherein redesigning the lens includes aspherizing the concentric annular rings.

21. An aspheric multifocal concentric annular ring lens which reduces aberrations and enhances contrast to provide improved visual acuity, comprising:
   a. a lens having a front surface and a back surface, wherein one of the front and back surfaces has an aspheric curve which has a progressive aspheric k value from 0 for a spherical curve in the center of the lens to a defined end point in the form of an elliptical, hyperbolic or parabolic curve, by a defined function, where k is a variable in the general conic equation $y=x^2+(r+\sqrt{r^2-(k+1)x^2})$ such that k=0 for a sphere, k=−1 for a parabola, 0>k>−1 for an ellipse, and k<−1 for a hyperbola; and
   b. the other of the front and back surfaces comprises a multifocal curve having a plurality of concentric spherical annular rings providing both a distant image and a near image.

22. An aspheric multifocal concentric annular ring lens which reduces aberrations and enhances contrast to provide improved visual acuity, comprising:
   a. a lens having a front surface and a back surface, wherein one of the front and back surfaces has an aspheric curve which has a spherical central area to ease in vitro parameters and in vivo fitting, with a surrounding aspheric curve with a progressive aspheric k value from 0 for a spherical curve in the center of the lens to a defined end point in the form of an elliptical, hyperbolic or parabolic curve, by a defined function where k is a variable in the general conic equation $y=x^2+(r+\sqrt{r^2-(k+1)x^2})$ such that k=0 for a sphere, k=−1 for a parabola, 0>k>−1 for an ellipse, and k<−1 for a hyperbola; and
   b. the other of the front and back surfaces comprises a multifocal curve having a plurality of concentric spherical annular rings providing both a distant image and a near image.

23. An aspheric multifocal concentric annular ring lens as claimed in claim 22, wherein the spherical central area is less than 2.00 mm in diameter.

* * * * *